United States Patent [19]

Göldner et al.

[11] 4,256,341
[45] Mar. 17, 1981

[54] HEAD SUPPORT FOR VEHICLE SEATS

[75] Inventors: Walter Göldner, Ebersbach; Werner Strien, Stuttgart-Heumaden, both of Fed. Rep. of Germany

[73] Assignee: Recaro GmbH & Co., Kirchheim, Teck, Fed. Rep. of Germany

[21] Appl. No.: 59,959

[22] Filed: Jul. 23, 1979

[30] Foreign Application Priority Data

Aug. 19, 1978 [DE] Fed. Rep. of Germany ... 7824813[U]
Apr. 3, 1979 [DE] Fed. Rep. of Germany ... 7909580[U]

[51] Int. Cl.³ .............................................. A47C 1/10
[52] U.S. Cl. .................................... 297/410; 297/408
[58] Field of Search ............... 297/391, 408, 409, 410, 297/216

[56] References Cited

U.S. PATENT DOCUMENTS

| | | | |
|---|---|---|---|
| 192,898 | 7/1877 | Clough | 297/410 X |
| 1,196,413 | 8/1916 | Yohe | 297/410 |
| 2,828,810 | 4/1958 | Barecki et al. | 297/408 X |
| 2,869,622 | 1/1959 | Peterson et al. | 297/408 X |
| 3,307,874 | 3/1967 | Wilson | 297/408 |
| 3,692,356 | 9/1972 | Mertens | 297/408 |
| 4,099,779 | 7/1978 | Goldner | 297/410 X |
| 4,111,484 | 9/1978 | Jaeger | 179/410 |

Primary Examiner—James T. McCall
Attorney, Agent, or Firm—Wigman & Cohen

[57] ABSTRACT

There is disclosed an improved head support for vehicle seats with a padded support member which forms a hollow space, a holder including at least one bar-shaped support which extends from below into the inside of the padded support member, a connecting body which connects the padded support member with the holder so that the padded support member can be swiveled around a transverse axis and can be vertically adjusted along the longitudinal axis of, and relative to the holder, as well as a notched device which holds the padded support member at the selected height by means of a friction or force fit.

18 Claims, 6 Drawing Figures

HEAD SUPPORT FOR VEHICLE SEATS

BACKGROUND OF THE INVENTION

The present invention relates to a head support for vehicle seats with a padded support member which forms a hollow space, a holder including at least one bar-shaped support which extends from below into the inside of the padded support member, a connecting body which connects the padded support member with the holder so that the padded support member can be swiveled around a transverse axis and can be vertically adjusted along the longitudinal axis of, and relative to the holder, as well as a notched device which holds the padded support member at the selected height by means of a friction or force fit.

In the case of the known head supports of the aforementioned general type, there is the possibility that in the event of an accident, the seat occupant's head can impact with the head support, e.g., obliquely from the front and above, such that the holding force of the notched device will be overcome, thereby forcing the padded support member downwardly to a lower position. Should such a displacement of the head support occur, the seat occupant's head can be swung far to the rear creating the danger of a broken neck.

SUMMARY OF THE INVENTION

An object of the present invention is to provide a head support of the aforementioned type in which an unwanted downward displacement of the padded support member is at least essentially eliminated. Another object of the present invention is to provide a head support of the aforementioned character wherein the height may be adjusted in a simple manner and with minimum effort. These and other objects have been accomplished according to the present invention by providing means whereby at least one rib is placed inside the padded support member and includes notches extending longitudinally from top to bottom. The notched rib faces the interior of the padded support member. The upper end of the holder is at least form fitted with one of these notches when the head support is pivoted to the greatest possible angle to the rear as when forced from above.

With a strong force applied from the front, or obliquely from above and in front as can be exerted on the head support by the head of the seat occupant in a collision, the padded support, held by friction in a chosen angle position, is pivoted to the rear to the limit of its pivot range. In this pivoted position, the holder and the rib come into form fitting contact, so that the padded support cannot be displaced downwardly, even if the force exerted on the padded support is greater than the friction moment of the notched device. The adjustability of the head support is unaffected by the rib in relation to the pivoted position or the height position. It is further especially advantageous that the effort to secure the padded support against an unwanted height change is very small, since only one rib is necessary to prevent it.

With two bar-shaped supports, the rib or ribs can lie in the pivot plane of each support. With an arched holder the rib can be situated between the shanks of the arch and can lie in the pivot area of the arch yoke. Of couse, in such a case two or more ribs can also be provided.

The rib members can be manufactured with little difficulty, especially where the front wall of the padded support is made of plastic and the rib members are formed in one piece with the front wall.

In order to substantially prevent local overstressing of the rib material, one preferred embodiment provides that the part of the holder which engages with the notches be rounded on the upper side. The upper sides of each notch have a corresponding rounding thus assuring that good contact will be made over a relatively large surface area.

The lower sides of the notches have preferably variable angles of inclination according to the inclination of the correspondingly shaped part of the holder when engaged. This ensures also that the notched parts will reliably engage.

Where a plastic sleeve is situated on each of the supports so as to be longitudinally adjustable and variably securable, with which sleeve the padded support member is swivelingly connected, then at least one rib can be combined into a single construction unit with the sleeve. Where two supports are used with a connecting part which extends from one sleeve to the other, the supports and/or a crossbar which connects both supports at their upper end, is continually engaged with one of the rib notches. Such an arrangement of one or more ribs can ensure that the padded support will not be subjected to an unwanted downward displacement at any point in its pivot range. In addition, there is provided a continually effective notched device which is capable of holding a notched device provided on the sleeves, or the padded support at the selected height. A single, unrounded support or two preferably rounded supports which can be connected with one another by a crossbar are used. In contrast to a notched device on the sleeve which includes stop rings which engage the notches on the support, the ribs, according to the invention, have the advantage that their locking force is increased when force is exerted on the head support causing the head support to pivot to its hindmost position. Such a force creates a backward force component, e.g., backward swiveling, such that the support or the crossbar is thrust with increased force into the notches on the rib or ribs.

Jamming of the padded support as it is adjusted for height can be avoided in the case of two supports by arranging the rib or ribs symmetrically to the supports. If a connecting piece is present between the two sleeves, a single rib can be utilized therebetween. Additionally, or in place of this rib, two or more ribs can be provided on this connecting piece or on the sleeves and positioned symmetrically with respect to the center. If no connecting piece is provided, each sleeve should be provided with a rib. In a preferred embodiment, the ribs are formed as a single unit with the respective sleeve or with the connecting piece.

Inasmuch as the rib or ribs are supported by a connecting piece running from one sleeve to the other and allowing a certain torsion, the ribs need not be formed to create torque. The torsion capacity of the connecting piece can be used when adjusting the height of the head support to force the ribs far enough out of the way that the support or the crossbar disengages from the notches on the rib members. If, however, the ribs are provided with the sleeves or formed with the sleeves, the ribs must be capable of moving far enough from the support or crossbar to be disengaged from the notches.

To ensure that the ribs securely engage with the padded support member when in its maximum rear position, thereby achieving increased locking force, each rib preferably includes a contact surface on the side opposite the notches which makes contact with the padded support member in its maximum rear position.

For safety reasons, each rib preferably extends upwardly beyond the respective support bar or the crossbar. It is important, particularly in the case of a crossbar, that the upper end of the support bar or bars is rounded or capped to prevent it from penetrating the padded support.

BRIEF DESCRIPTION OF THE DRAWINGS

The present invention is explained in greater detail hereinbelow by means of an example shown in the drawings wherein.

DETAILED DESCRIPTION OF THE PREFERRED EMBODIMENTS

Figure 1:
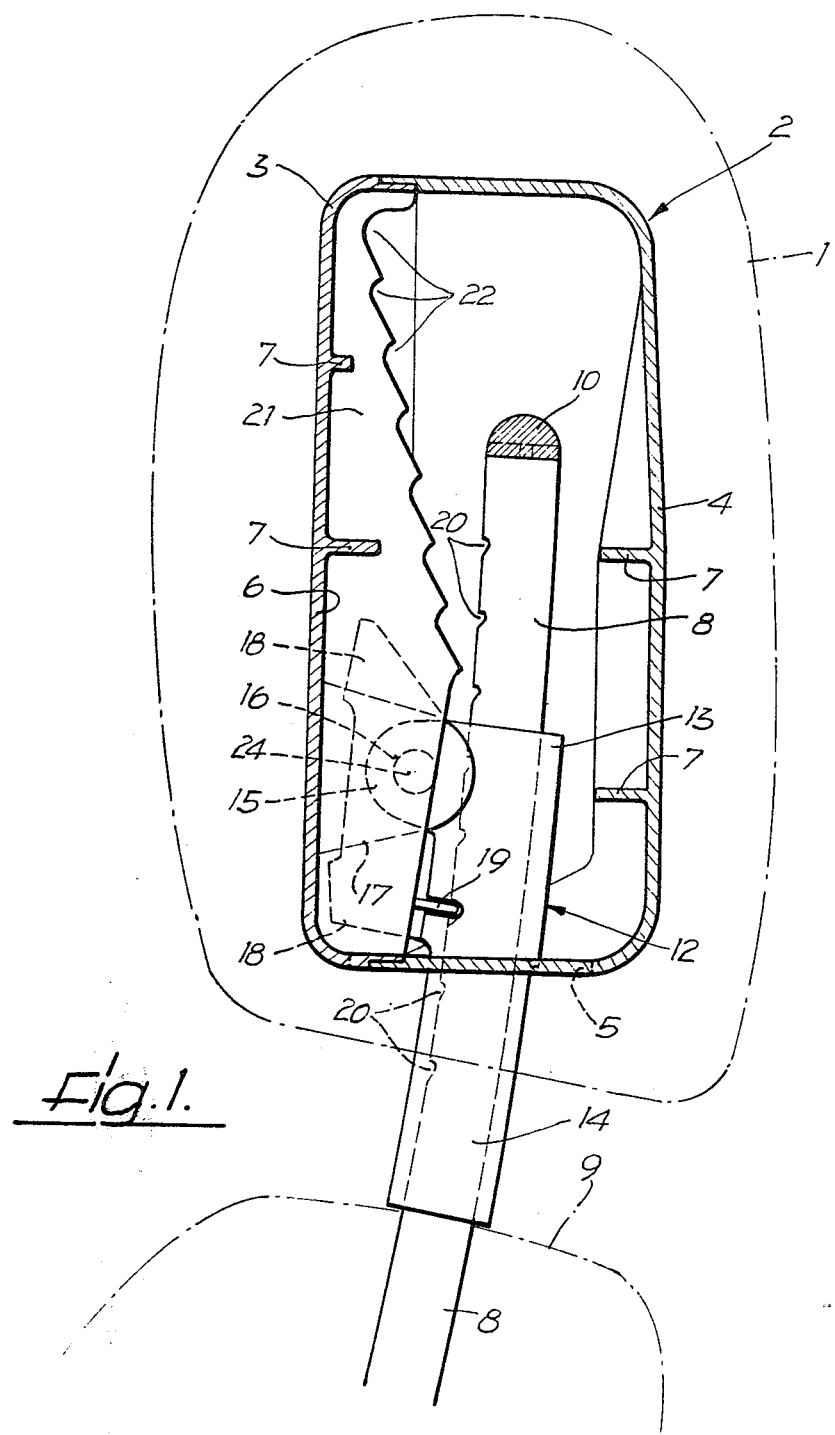
FIG. 1 is a cross section of an embodiment of the present invention in a normal operating position.
Figure 2:
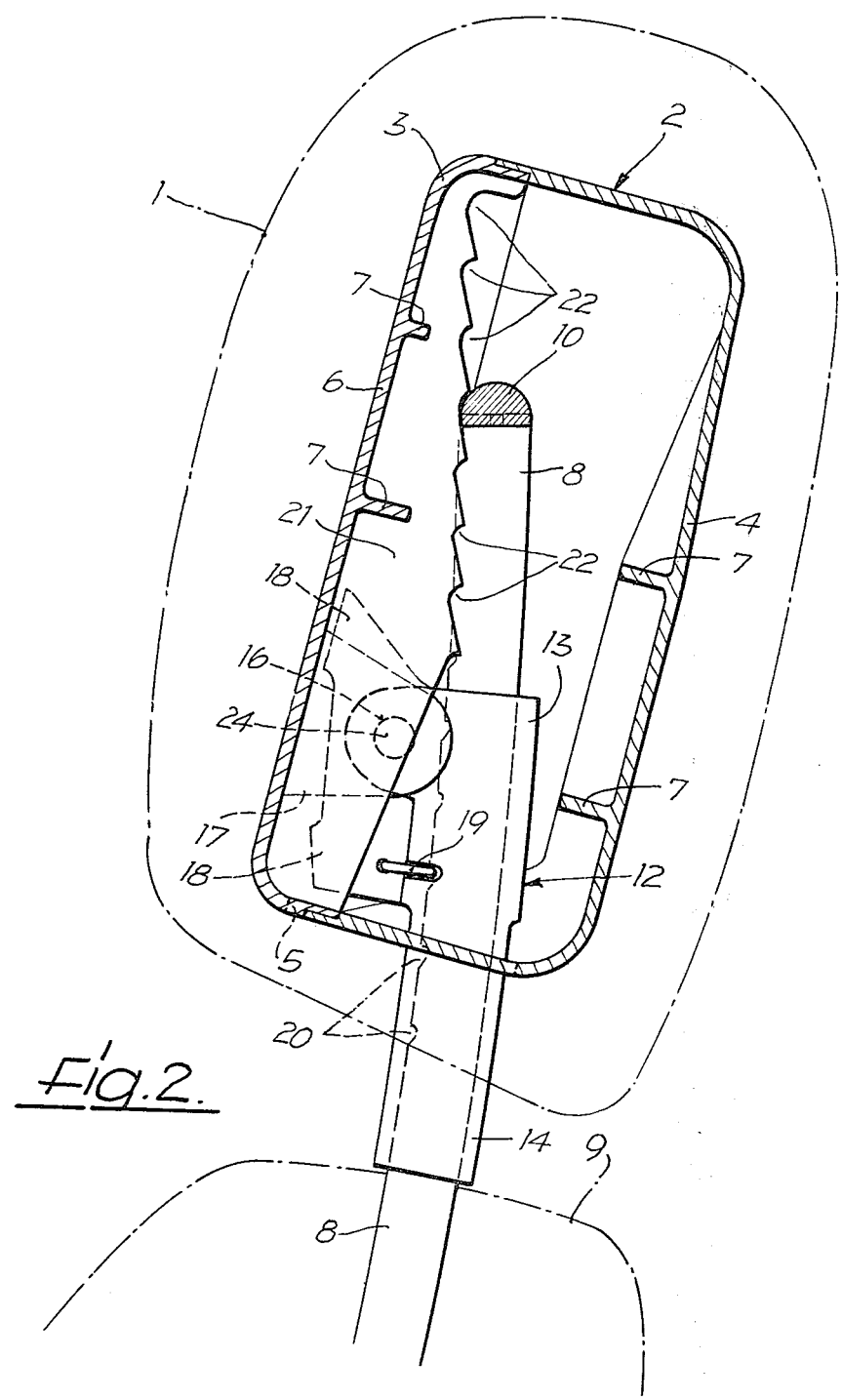
FIG. 2 is a cross section of the embodiment of FIG. 1 but in a position which prevents the downward displacement of the head support.

Referring now to FIGS. 1 and 2 of the drawings, the molded foam padding 1 (shown in phantom lines) of a head support for a motor vehicle seat completely covers a hollow padded support member 2. The padded support member 2 is composed of a front shell 3 and a back shell 4, each of which is formed in one piece of synthetic plastic. The inwardly extending rim of the rear shell 4 overlaps the inwardly extending rim of the front shell 3 to completely close the padded support member 2 in the front, rear, top, and also the sides, with the exception of two apertures 5 located at the bottom. Reinforcing ribs 7 are formed in the interior of the front wall 6 of shell 3. Similarly, ribs 7 are provided in the interior of the rear wall of shell 4.

Two identically formed, parallelly arranged support bars 8 whose lower terminal portions can be attached to the bearing parts of a seat back 9 extend through the two apertures 5 of support member 2 into the interior thereof.

The height of the head support in relation to the seat back 9 can be adjusted by adjusting the height of the padded support member 2 relative to the two support bars 8. The upper terminal portions of the support bars 8 are fixedly attached to each other by a crossbar 10 such that the support bars 8 with the crossbar 10 from a U-shaped arch. The crossbar 10 comprises a rod with a semi-circular cross section whose cylindrical side is situated towards the top. Alternatively, crossbar 10 could be formed of a bar with a circular cross section. To facilitate attachment with the support bars 8, the crossbar 10 is flat on its ends.

A pair of identical plastic guides 12, each having a sleeve 13, is provided for receiving a respective cylindrical support bar 8. The support bar 8 is inserted to be adjustable in its longitudinal direction. The sleeve 13 is provided with an extension 14 which extends through the aperture 5 and, in the lowest position of the padded support member 2, extends to the upper edge of the seat back 9. Extension 14 covers the support bars 8 in the area between the head support and the upper edge of the seat back 9.

In the vicinity of the upper terminal portion of the sleeve 13 and on its side facing the front wall 6, a hub 15 is formed with a bore 16 situated in front of the sleeve 13 for receiving a pivot pin 24.

The longitudinal axis of the bore 16 in hub 15 is in alignment with the longitudinal axis of a second bore 16 formed in another hub 15. The longitudinal axis of the bores 16, lie parallel to the front, back, top and bottom walls of the padded support member 2 and thus horizontal in their operating position. Each hub 15 is positioned between two attachment side plates 17 formed on the interior of the front wall 6 and are penetrated by the associated pivot pin 24. With the aid of a friction washer in each hub, the attachment side plates 17 are pressed against the end surface of the hub 15 with an appropriate force. Therefore, a force greater than this friction force must be exerted on the padded support member 2 in order to change its pivot position.

To limit the pivot range, a stop 18 is formed in both guide bodies 12 extending toward the front shell 3. The parts of this stop 18 lying above and below the hub 15 make contact with the inside of the front wall 6 when the padded support member 2 is in its fully pivoted position either forward or backward.

The height of the padded support member 2 can be adjusted in steps. In each height position, a stop spring 19—fixedly attached to each guide body 12—engages into the respective stop notch 20 arranged on the side of the support bars 8 confronting the front wall 6. To prevent a force exerted from above on the padded support member 2 from overcoming the force on the stop ring 19, thus forcing the padded support member 2 downward together with the guide bodies 12 attached to it above the pivot pin relative to the support bars 8, a notched rib 21 is formed extending from the bottom to the top in the middle between the two support bars 8 on the inside of the front wall 6 of the front shell 3. This notched rib 21 is arranged vertically on the front wall 6 and possesses a continuous row of notches 22 running the length of the edge confronting the interior of the padded support member 2. The edge section at the notched rib 21 containing the notches 22 has approximately the same angle of inclination relative to the front wall 6 as the support bar 8 when the padded support member is fully pivoted to the back (as best shown in FIG. 2).

The notches 22 terminate just above the attachment side plates 17. From this point down, the height of the notched rib 21 reduces until the bottom edge of the front shell 3 is reached. The upper flank of each notch 22 is rounded, whereas the lower flank has the same inclination as the forward facing narrow side of the crossbar 10. Only the upper flank of the uppermost notch is extended to the height of the upper edge of the front shell 3.

A strong force which is imparted obliquely from above and in front to the head support pivots the padded support member 2 to its maximum back position. As shown in FIG. 2 (and also FIG. 3) in this maximum position the crossbar 10 engages one of the notches 22, whereby good contact with the upper flank of notch 22 is achieved through the cylindrical rounding of the upper side of the crossbar 10. The approximation in inclination between the lower flank and the lateral surface of the crossbar 10 makes this engagement secure. A strong force can therefore displace the head support only the distance of two notches at the most because after such a displacement the crossbar 10 engages one of the notches 22 and this interlocking prevents further displacement.

It would also be possible to provide two or more notched ribs to engage with the crossbar 10, or to arrange the notched ribs so that they are aligned with the support bars 8 and can engage their upper ends.

Figure 3:
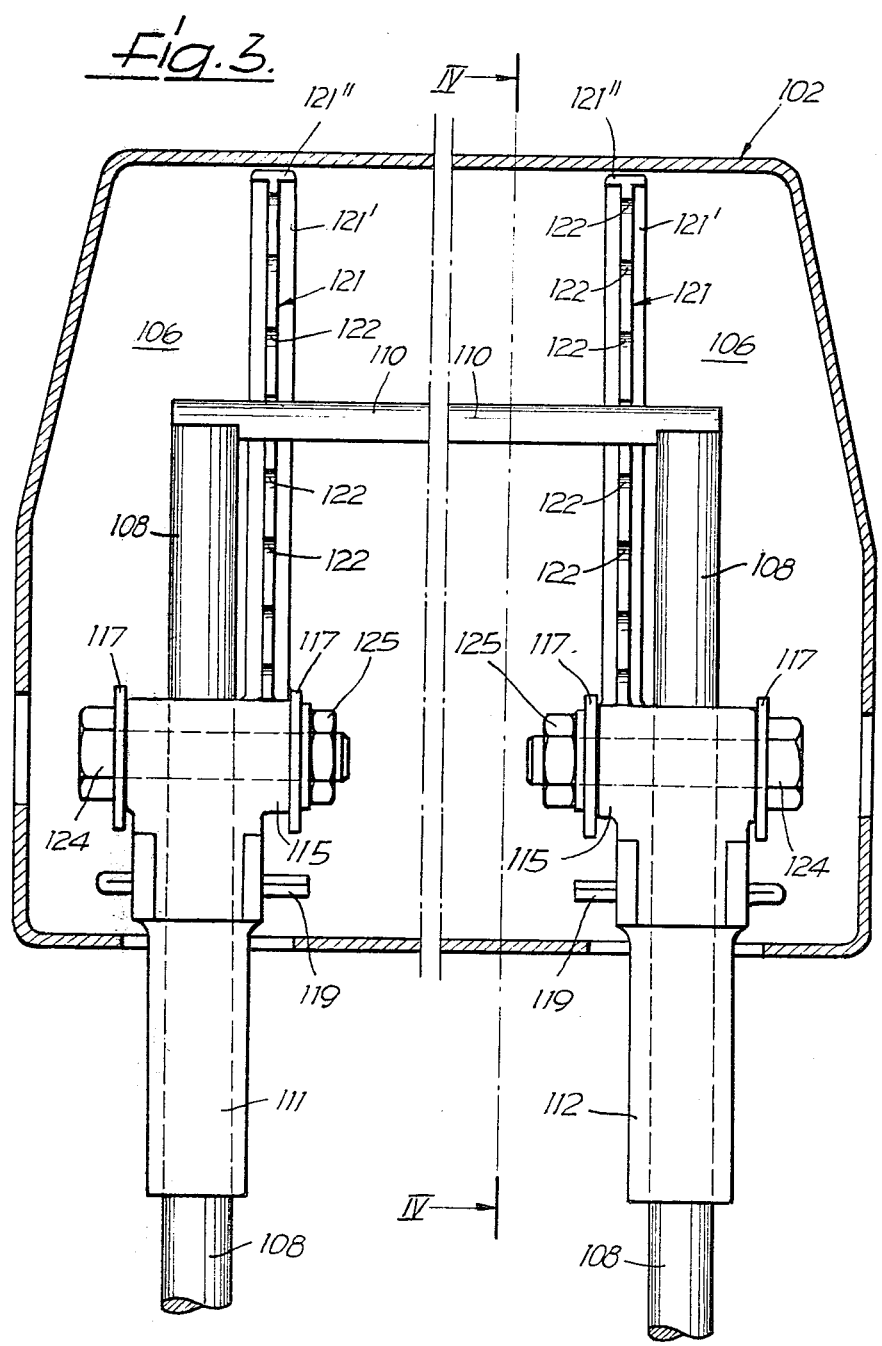
FIG. 3 is a partial cross-sectional representation of a second embodiment of the present invention from the rear view.
Figure 4:
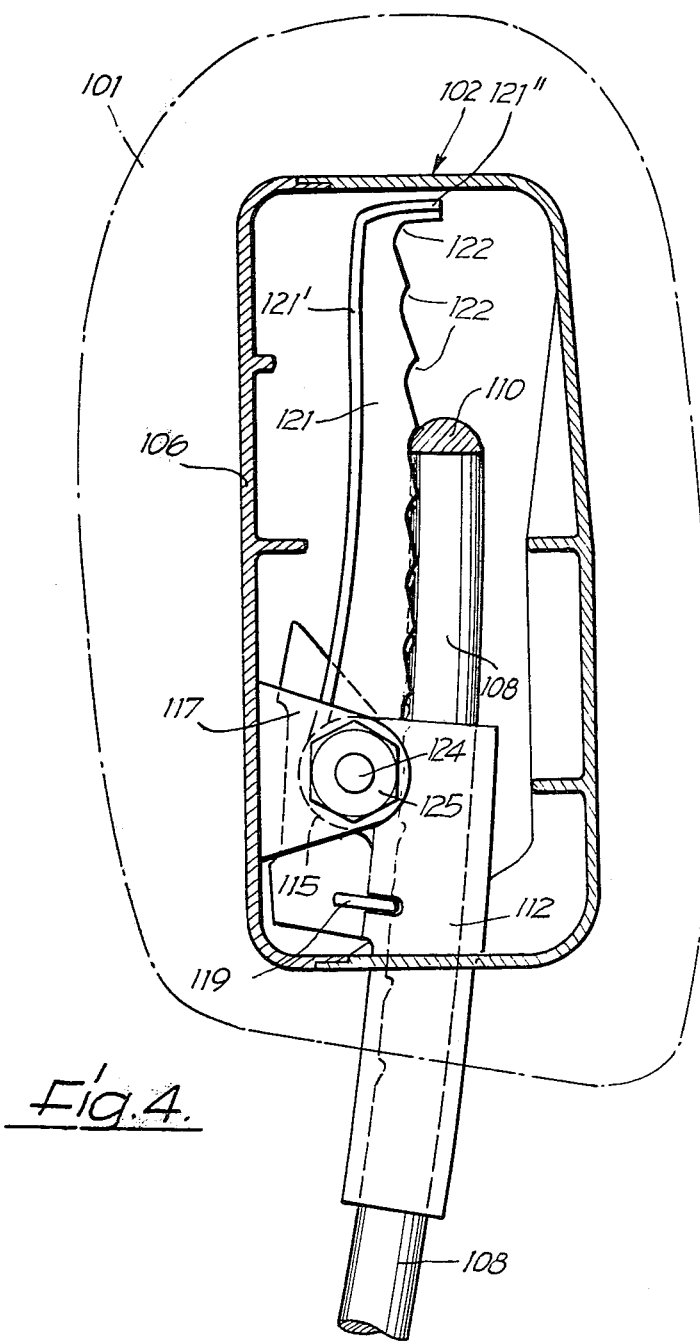
FIG. 4 is a cross section taken along the line IV—IV of FIG. 3.

A second embodiment of the present invention is shown in FIGS. 3 and 4. Two parallelly spaced, identical support bars 108, the upper ends of which are fixedly connected by a crossbar 110, extend through respective plastic sleeves 111 and 112. Sleeves 111 and 112 are identical, but are mirror images of each other. A hub 115 is formed on the front side of each of the sleeves 111 and 112, the bore of which is at a 90° angle to the guide channel for the support bar and is parallel to the longitudinal axis of the crossbar 110.

The two hubs 115 are arranged between two side plates 117 formed on the interior surfaces of the front wall 106 of a box-shaped padded support member formed of plastic, the assembly being designated as 102. The padded support member is so constructed that the bores of the side plates 117 are in horizontal alignment and define a pivot axis. Bolts 124 extending through the side plates 117 and the hub 115 which fits between them, form pivot pins around whose longitudinal axis the padded support member 102 pivots. Nuts 125 press the side plates in opposition to the bolt head against the hub 115 with sufficient force to eliminate any unwanted pivoting.

Each of the sleeves 111 and 112 has a rib 121 extending upward from the upper end of the sleeve and its hub 115 beyond the crossbar 110. The lower end of the rib 121 attaches to the interior part of the upward facing surface of the sleeve and its side plates 117 so that the rib 121 extends relatively close to the support bar 108 on the inside.

The two identical ribs 121 and a T-shaped cross-sectional profile with the cross member 121 located on the side toward the front wall 106 of the padded support member 102. As seen in FIG. 4, the edge of rib 121 facing away from the front wall 106 forms an unbroken row of notches 122, and this edge is so arranged in relation to the crossbar 110 that it is constantly engaged with one of the notches 122. The crossbar 110 can be disengaged from one notch and moved to another to adjust the head support height since the ribs 121 are capable of being suitable displaced in a counterclockwise direction from the crossbar 110 against the spring tension associated therewith. The upper end segment 121' of rib 121 is angled to the rear and overlaps the crossbar 110.

Should a strong force be exerted on the padded support member 102 through the surrounding padding 101 obliquely from in front and above, as is possible in an accident, the padded support member pivots backward or in a clockwise direction (with reference to FIG. 4) until it contacts the cross member 121' of rib 121. This presses ribs 121 with increased force against the crossbar 110 and prevents the latter from disengaging from the notches 122. This prevents the downward displacement of the padded support member 102 by an external force.

To the extent that the ribs 121 are not capable of reliably holding the padded support member 102 at the selected height, or that the ribs 121 are purposely so designed not to have enough locking strength, each sleeve can be provided with an additional locking device, e.g., a stop spring 119 which holds the sleeve between its shanks and extends through an aperture in the sleeve and engages notches on the support bar 108.

Figure 5:
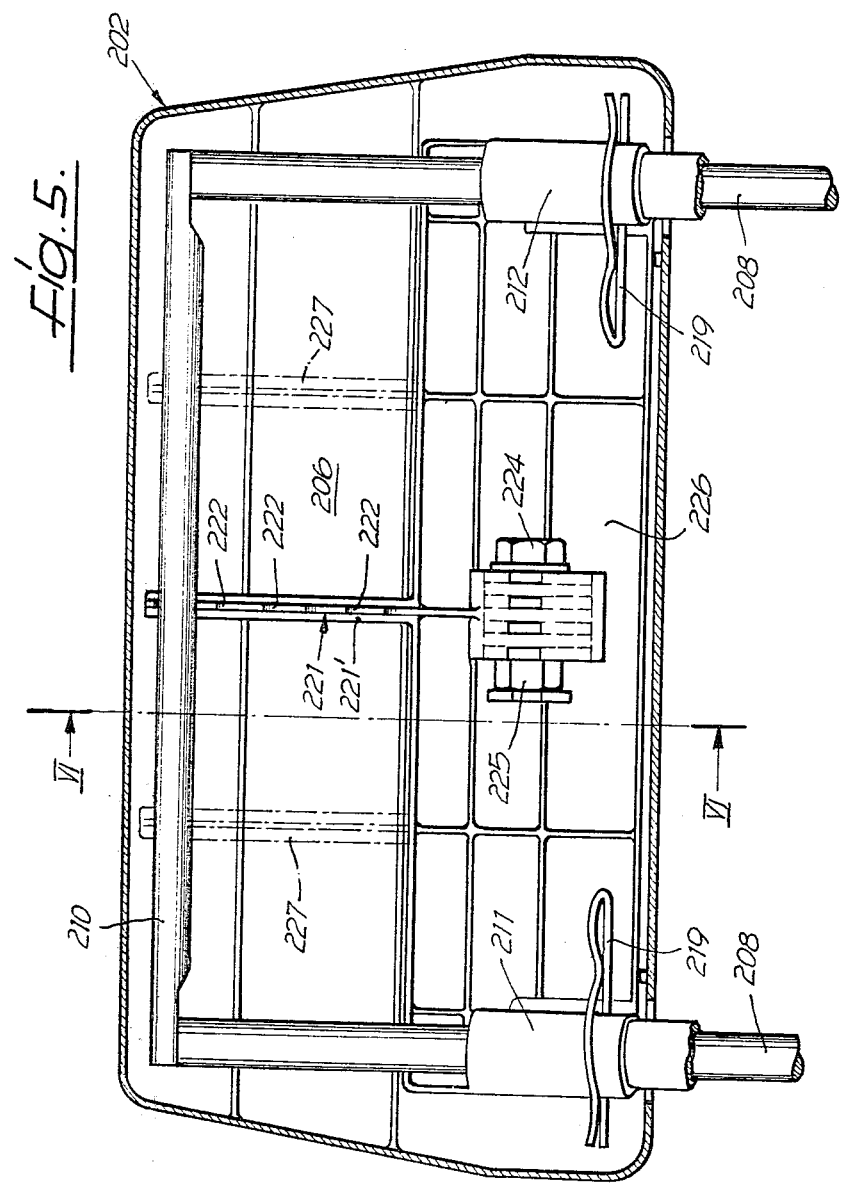
FIG. 5 is a partial cross-sectional representation of a third embodiment of the present invention from the rear view.
Figure 6:
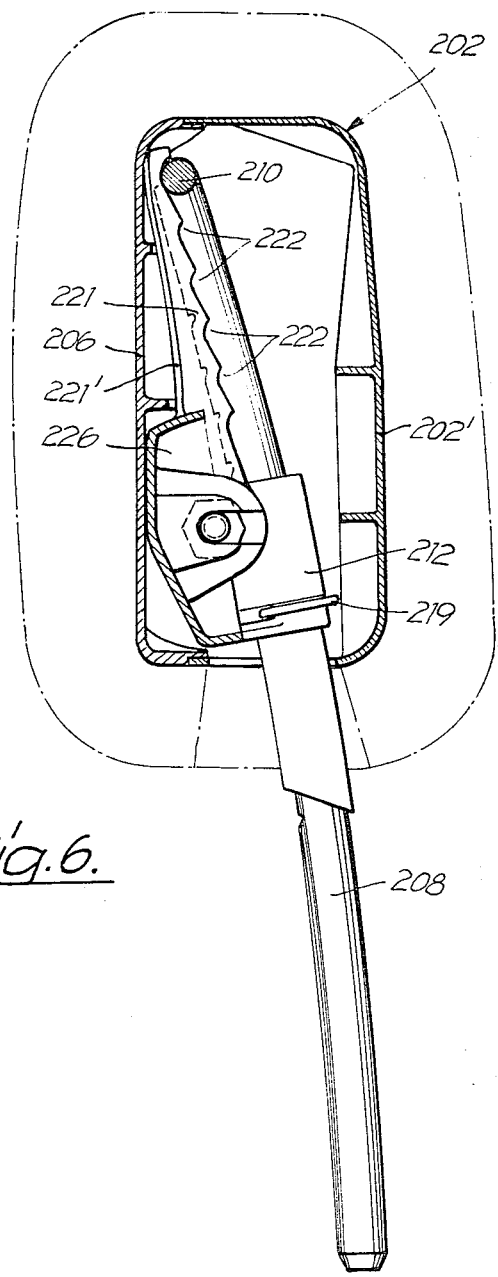
FIG. 6 is a cross section taken along the line VI—VI of FIG. 5.

The embodiment shown in FIGS. 5 and 6 of a head support for motor vehicles also exhibits two parallelly spaced, and identical support bars 208 whose upper ends are fixedly connected by a crossbar 210. Further, as depicted therein, a sleeve 211 or 212 is arranged on the support bars 208. The sleeves 211, 212 are identical but mirror images of each other. The support bars 208 are fitted through these two sleeves where they can be longitudinally moved.

The plastic sleeves 211 and 212 are formed in a single piece with a plastic connecting part 226 having a middle section which forms a generally rectangular plate which is reinforced at its upper portion by a rearwardly extending bent edge as shown in FIG. 6. Connecting side plates are formed on the middle section of this connecting part 226 between which appropriate side plates formed on the inside of the front wall 206 of the padded support member extend. A bolt 224 extends through each of the connecting side plates and forms a pivot pin parallel to the crossbar 210 around which the padded support member can pivot relative to the support bars 208. The friction necessary to prevent unwanted pivoting of the padded support member 202 is produced by a nut 225. As described earlier in connection with the other two embodiments, nut 225 presses the intermeshing plates against each other in opposition to the bolt head.

A rib 221 lying in a vertical plane penetrated by the bolt 224 and extending beyond the upper edge of the connecting part 226 is formed onto the middle section of the connecting part 226 and extends upwardly beyond the crossbar 210. Rib 221 has a T-shaped profile whereby the cross member 221' runs along the edge facing the front wall 206 of padded support member 202. The edge facing away from the front wall 206 is provided with a row of notches 222 and is so located in relation to the crossbar 210 as to be in constant contact with one of the notches 222.

The function of the connecting part 226 permits adjusting the height of the head support, e.g., a minimum displacement force can be applied to dislocate the crossbar 210 from the associated notch 22. Of course, rib 221 could be formed, as in the second embodiment, with enough elasticity to allow dislocation.

In place of or in addition to a centrally situated rib 221, two ribs 227 can be arranged symmetrically with respect to the center, as indicated by the dotted line in FIG. 5. These ribs 227 would be formed onto the connecting part 226 as are ribs 221. When a strong force applied obliquely from in front and above pushes the head support completely back, the front wall 206 of the padded support member 202 contacts the cross member 221' of rib 221 and thereby pushes this rib with increased force against the crossbar 210. This prevents the head support from being displaced downward by an increased force.

As with the second embodiment, a locking device can be provided on both sleeves 211 or 212 in addition to rib 221 or ribs 227 which locks the sleeves to support bars and prevents displacement. This locking device can comprise a stop spring 219, as shown in FIGS. 5 and 6, which holds the sleeve between its shanks and extends one shank through an aperture in the sleeve to engage a notch on the support bars.

Although only three preferred embodiments are specifically illustrated and described herein, it will be appreciated that many modifications and variations of the present invention are possible in the light of the above teachings and within the purview of the appended claims without departing from the spirit and intended scope of the invention.

What is claimed is:

1. In a head support for a vehicle seat including a padded support member and a holder having at least one bar-shaped support extending from below into the interior of said padded support member, the improvement comprising:
    at least one rib extending substantially from top to bottom interiorly of said padded support member,
    said rib being located between said holder and a front wall of said padded support member,
    said rib including notches arranged along its length and opening to the inside of said padded support member, and
    an upper portion of said holder having means for engaging said notches when said padded support member is pivoted to the rear.

2. In a head support for a vehicle seat comprising a padded support member forming a hollow space, a holder having at least one bar-shaped support extending from below into the interior of said padded support member, a connecting body swivelingly connecting said padded support member to said holder around a transverse axis and being swivelingly and vertically adjustable relative to said holder, and a locking notch device for holding the padded support member at the selected height, the improvement comprising at least one rib extending from top to bottom interiorly of said padded support member, said rib including notches arranged along its length and opening to the inside of said padded support member, the upper portion of said holder having means for engaging said notches when said padded support member is pivoted to the rear,
    wherein the rib is arranged interiorly of said padded support member on its front wall.

3. The improvement according to claims 1 or 2, including two bar-shaped supports, said rib positioned therebetween.

4. The improvement according to claims 1 or 2, wherein said holder is arched, and said rib is arranged between the shanks of the arch formed by the supports, and said notches lie in the pivotal plane of said arch yoke.

5. In a head support for a vehicle seat comprising a padded support member forming a hollow space, a holder having at least one bar-shaped support extending from below into the interior of said padded support member, a connecting body swivelingly connecting said padded support member to said holder around a transverse axis and being swivelingly and vertically adjustable relative to said holder, and a locking notch device for holding the padded support member at the selected height, the improvement comprising at least one rib extending from top to bottom interiorly of said padded support member, said rib including notches arranged along its length and opening to the inside of said padded support member, the upper portion of said holder having means for engaging said notches when said padded support member is pivoted to the rear,
    wherein at least the front wall of said padded support member is made of plastic and said rib is formed in one piece with the front wall.

6. In a head support for a vehicle seat comprising a padded support member forming a hollow space, a holder having at least one bar-shaped support extending from below into the interior of said padded support member, a connecting body swivelingly connecting said padded support member to said holder around a transverse axis and being swivelingly and vertically adjustable relative to said holder, and a locking notch devide for holding the padded support member at the selected height, the improvement comprising at least one rib extending from top to bottom interiorly of said padded support member, said rib including notches arranged along its length and opening to the inside of said padded support member, the upper portion of said holder having means for engaging said notches when said padded support member is pivoted to the rear,
    further including a sleeve arranged on each support bar having an upper end portion extending upwardly into the interior of said padded support member, said sleeve being vertically adjustable and adjustably securable at a selected height, said sleeve being operatively connected to said padded support member by a connecting part, said padded support member being swivelingly adjustable about a transverse axis.

7. The improvement according to claim 6, wherein at least one of said ribs is formed with said connecting part.

8. The improvement according to claims 6 or 7, further including a pair of supports, a crossbar connecting both supports at their upper ends constructed to engage with one of said notches.

9. The improvement according to claims 6 or 7 wherein said rib is formed as a single unit with the associated sleeve or with the connecting part.

10. The improvement according to claims 6 or 7, wherein said rib is elastic enough to allow the notches to disengage when sufficient force is exerted to overcome a force limit value holding the head support at a selected height.

11. The improvement according to claims 6 or 7, wherein said rib has a contact surface on the side opposite the notches which makes contact with said padded support member when said padded support member is in a fully backward pivoted position.

12. The improvement according to claims 1 or 6, wherein said rib has an angled end section which extends beyond the support or the crossbar.

13. The improvement according to claims 1 or 6, wherein the contact part of the holder which makes contact with the notches is curved on the side facing upwards and the upper flank of each notch has a corresponding curvature.

14. The improvement according to claim 7, wherein the contact part of the holder which makes contact with the notches is curved on the side facing upwards and the upper flank of each notch has a corresponding curvature.

15. The improvement according to claim 8, wherein the contact part of the holder which makes contact with the notches is curved on the side facing upwards and the upper flank of each notch has a corresponding curvature.

16. The improvement according to claims 1 or 6, wherein the lower flank of the notches has an angle of inclination corresponding to the angle of inclination of the contact part of the holder when engaged with the notches.

17. The improvement according to claim 7, wherein the lower flank of the notches has an angle of inclination corresponding to the angle of inclination of the contact part of the holder when engaged with the notches.

18. The improvement according to claim 8, wherein the lower flank of the notches has an angle of inclination corresponding to the angle of inclination of the contact part of the holder when engaged with the notches.

* * * * *